Sept. 10, 1929.    V. WILLOUGHBY    1,727,684
INSULATED TANK CAR
Original Filed May 7, 1923    3 Sheets-Sheet 2
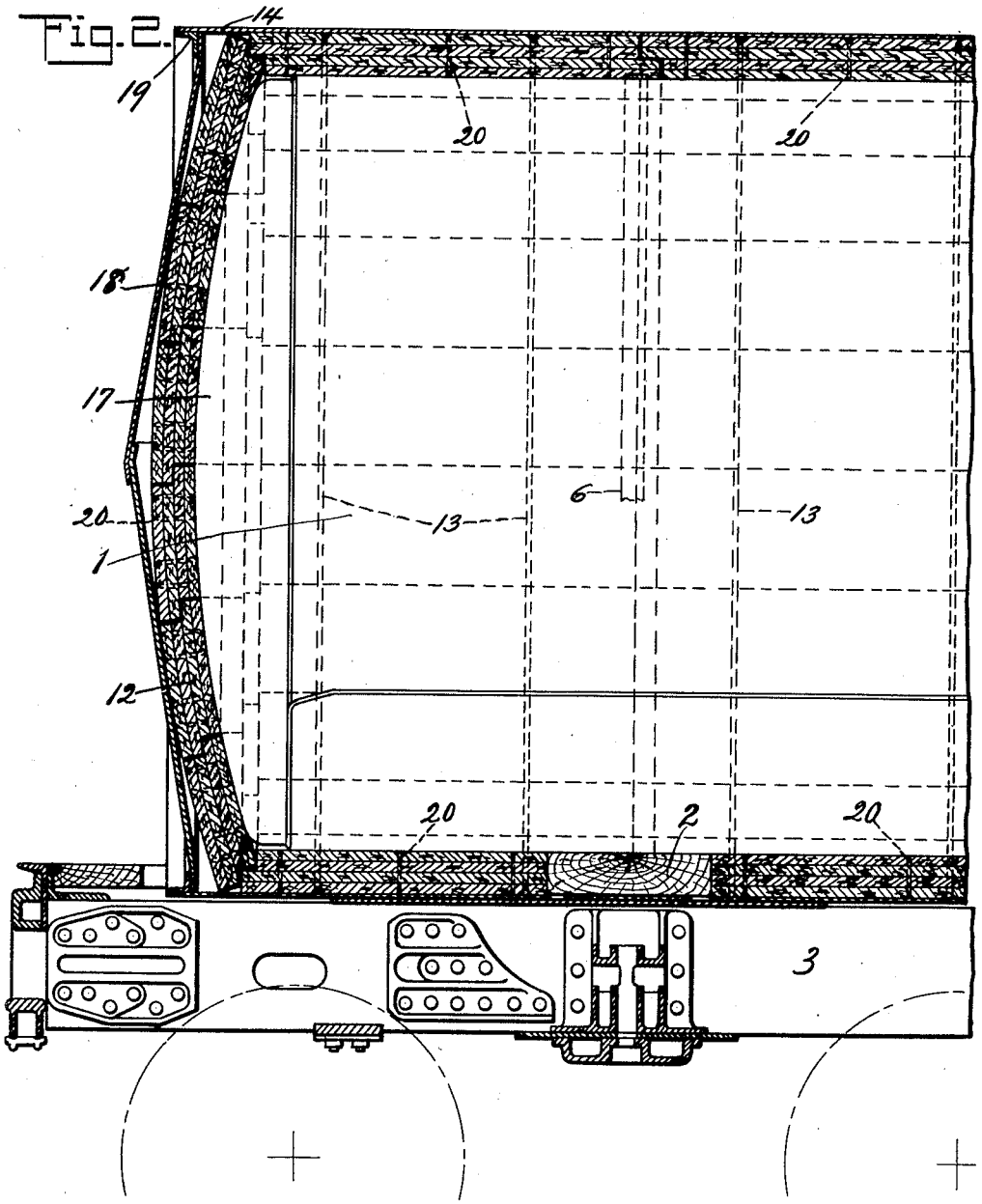
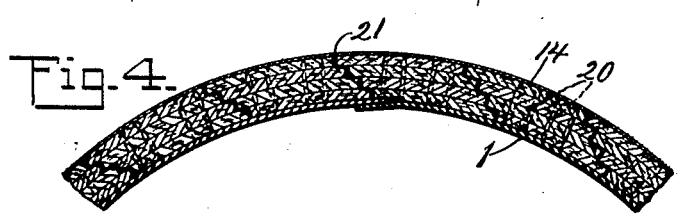
INVENTOR
Victor Willoughby
BY T.H. Gibbs
ATTORNEY Sept. 10, 1929.  V. WILLOUGHBY  1,727,684
INSULATED TANK CAR
Original Filed May 7, 1923  3 Sheets-Sheet 3
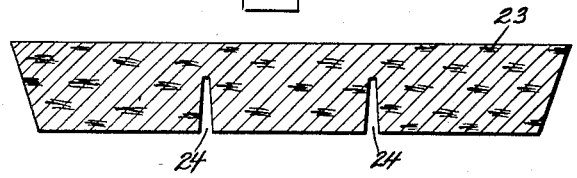
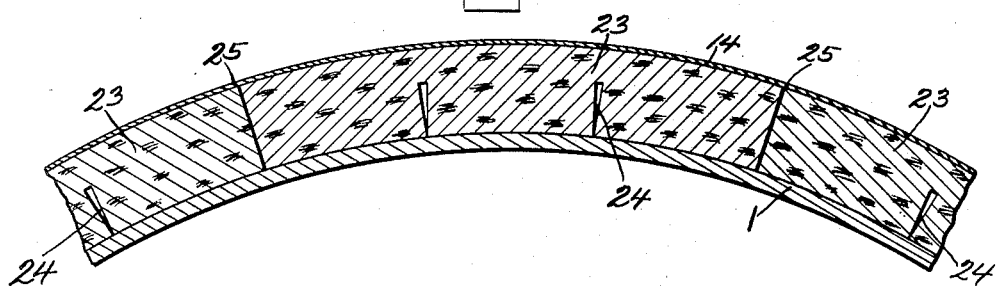
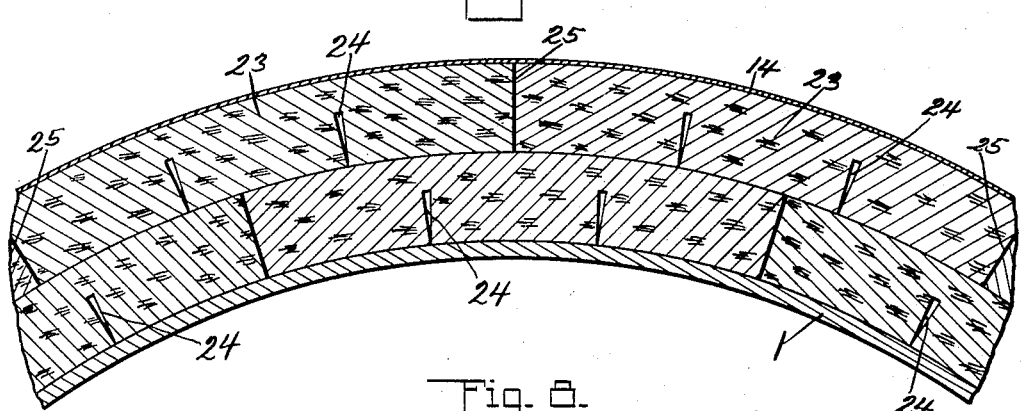
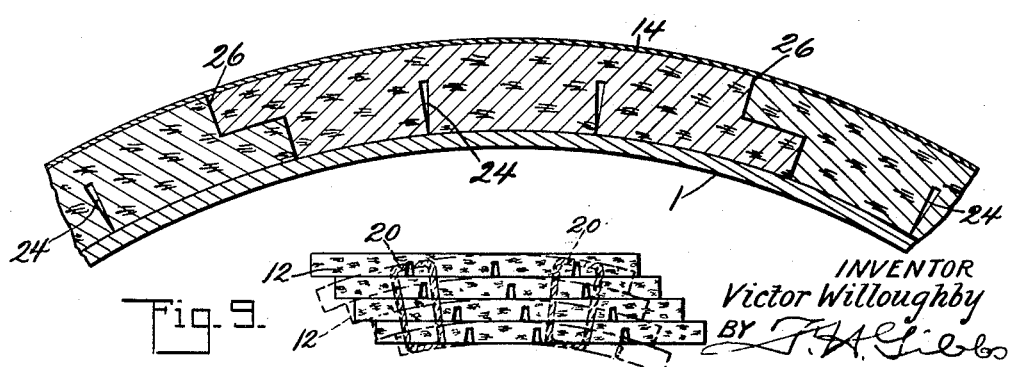
INVENTOR
Victor Willoughby
BY
ATTORNEY Patented Sept. 10, 1929.

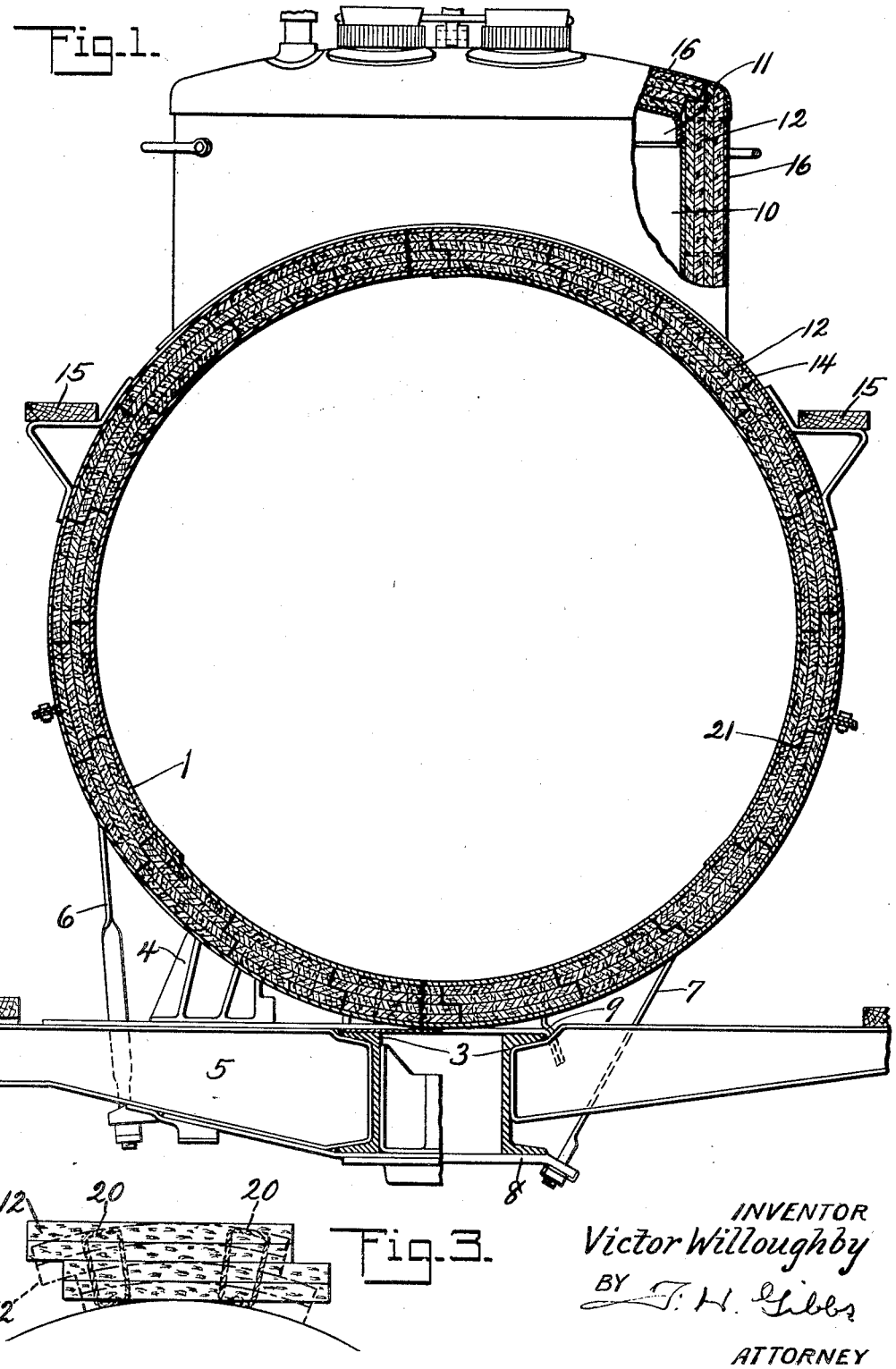

1,727,684

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

INSULATED TANK CAR.

Continuation of application Serial No. 637,228, filed May 7, 1923. This application filed December 17, 1925. Serial No. 76,128.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 1 shows two half sections of a tank insulated in accordance with this invention, the section at the left being taken outside the body bolster and the section at the right being taken inside the same bolster, both looking toward the center of the car and with the dome partly broken away to show the application of the insulation to the dome;

Fig. 2 is a partial central vertical longitudinal section taken at one end of the car;

Fig. 3 shows diagrammatically the manner in which insulation sections are formed;

Fig. 4 is a fragmentary section of a car tank showing the insulation sections slightly modified;

Fig. 5 is a sectional view of a single sheet of insulation having grooves cut therein;

Fig. 6 is a fragmentary section of a car tank showing one layer of insulation applied thereto;

Fig. 7 is a fragmentary sectional view of a car tank showing sections two layers in thickness applied to the tank;

Fig. 8 is a fragmentary sectional view similar to Fig. 6 and showing the sheets provided with overlapping end portions, and Fig. 9 is a diagrammatic view similar to Fig. 3 and shows the laminations provided with grooves on the underside thereof.

One object of the invention is to provide a car tank with an improved form of insulation sheet having grooves cut in the underside thereof for insuring the free bending of the sheet to fit the curved surface of a car tank.

Another object of the invention is to provide an improved insulated tank car and more particularly to provide an improved form of insulation composed of offset layers bent to shape and secured together to form insulation sections while so bent prior to attaching the sections to the car tanks.

This application is a continuation of my application for an "insulated tank car", Serial No. 637,228, filed May 7, 1923.

As shown in the drawings the tank 1 rests upon the tank slabbing 2 which is carried by the center sills 3 and the tank saddles 4 which rest upon the body bolsters 5. The tank is secured in position by the tank bands 6 and 7 which are secured to the bolster or to the straps 8 which are secured beneath the center sills. The tank is also secured to the sills at its center by the tank anchoring means 9 and is provided with the usual tank dome 10 having a dome head 11.

Surrounding the tank body is an insulation 12 which is secured in place by the binding wires or bands 13 externally girdling it and is covered by the outer sheathing 14 to which is secured the tank steps 15. The dome 10 is also covered with the insulation 12 which is protected by an outer sheathing 16 which extends over the insulation on the dome head 11. The usual safety valve and manhole openings are provided in the dome head and extend through the insulation 12 and the outer sheathing 16. The insulation 12 is also placed across the tank heads 17 and is covered by the end sheathing plates 18 which are secured to the sheathing 14 by angles 19.

The insulation 12 may be composed of cork composition or other suitable heat insulating material which will give the desired heat insulation and which at the same time will be sufficiently yielding to be bent to the desired shapes. The insulation 12 is formed in sections which may be composed of one or more sheets as desired. In Figs. 5, 6 and 8 the sections are each shown as composed of a single sheet, in Fig. 7 the sections are shown composed of two sheets and in Figs. 3 and 9 the sections are shown composed of four sheets. The sections are bent to the desired shape and then are applied to the car tank.

In Fig. 5 of the drawings a single sheet of insulation 23 is shown having V-shaped grooves 24 cut in the underside thereof. The V-shaped grooves formed on the sheet serve to compensate for the shortening of the inside surface of the sheet when it is bent crosswise of the grooving to fit the curved surface of the tank. The forming of V-shaped grooves in the sheets permits the using of sheets of greater thickness and moreover enables the free bending of the sheets to form sections having any desired number of sheets.

In forming insulation sections having a number of sheets or laminations, as shown in Figs. 3 and 9 of the drawings, the sheets are placed in a forming device and bent to a shape conforming to the curvature of the tank. While the section is bent in the forming device, the sheets are secured together by fasteners of cords or wires 20. The cords or wires 20 are passed through the sheets and have their ends secured together thus preventing relative movement of the sheets when released from the forming device and holding the sheets in the desired bent shape independently of their subsequent attachment to the tank. The sheets or layers are shown in Fig. 3 as grouped in two pairs with the pairs offset both laterally and longitudinally to give the unitary section stepped edges so that when the sections are brought together on the tank a joint similar to the ship-lap joint will be formed between each pair of sections. As shown in Figs. 4 and 9 each of the layers may be slightly displaced both laterally and longitudinally, giving a joint similar to a joint obtained with the structure of Fig. 3, but having the layers offset singly rather than in pairs. The sections may be placed as shown in Fig. 2 with the greater dimension of the sections extending lengthwise of the tank and the sections at the ends of the tank having their greater dimension extending crosswise of the tank or the sections may be placed with their greater dimension the other way by changing the way in which the layers are bent when the sections are formed. The outer sections of the insulation on the ends of the tank and on the dome head will, of course, have to be shaped to conform to the curvature of the ends and of the dome head and will be formed with projecting ends to engage with the projecting ends formed on the sections on the body of the tank and on the tank dome as shown in Figs. 1 and 2.

The bending qualities of the insulating material determine to a great extent the character of the sections which make up the insulation on the car tank. In certain cases the sections of insulation may be a single layer in thickness, as shown in Figs. 6 and 8 of the drawings. In Fig. 6 the ends 25 of the sheets 23 abut without any overlapping; whereas in Fig. 8 the sheets have their edges stepped and are thus provided with overlapping ends 26. In Figs. 6, 7, 8 and 9 the sheets are provided with V-shaped grooves which permit the shortening of the inside surface of each sheet.

Forming the insulating sections as described makes it possible to have the insulation of any desired thickness and the use of the layers renders the sections of more uniform density as imperfections are noticed in the thin layers that would be hidden if the sections were solid. Offsetting the layers provides a joint between the sections that will provide better insulation than a joint between sections having flat meeting surfaces and it also permits of the rows of sections subsequent to the first row being held in place by engagement with the rows previously secured to the tank and facilitates the application of the sections to the tank. It also provides a joint which will more securely hold a compound 21 which may be placed between the sections in order to improve the insulation at the joints.

What is claimed is:

1. In a tank, means insulating the same comprising unitary insulating sections for covering the tank, each section having stepped edges for forming overlapping joints with adjacent sections, the sheet material of the sections having grooves therein to permit the ready shaping of the sections to the form of the tank, and binding bands encircling the covering formed by said sheets to secure the sheets to the tank.

2. In a tank, means insulating the same comprising unitary laminated insulating sections for covering said tank, the laminations having grooves cut in them to permit the ready shaping of the sections to the form of the tank and having their layers offset to form overlapping joints between sections.

3. In a tank, means insulating the same comprising unitary laminated insulating sections for covering the tank, each section having its layers offset longitudinally and laterally to provide overlapping joints between sections, and said layers each having grooves cut in them to permit the ready shaping of the sections to the form of the tank.

4. As an article of manufacture, a laminated section of car tank insulation composed of superposed layers bent to conform to a curved tank, and fasteners through the superposed layers holding them together and thereby maintaining their curved form, independently of any attachment to a tank.

5. As an article of manufacture, a laminated section of car tank insulation composed of superposed grooved layers bent crosswise of the grooving to conform to a curved tank, with fasteners through the superposed layers between grooves holding them together and maintaining them in their curved form, independently of any attachment to a tank.

6. As an article of manufacture, a laminated section of car tank insulation composed of superposed grooved layers bent crosswise of the grooving to conform to a curved tank, and means connecting said layers together to maintain them in that form, independently of attachment to a tank.

7. In a tank, means insulating the same comprising a covering composed of pre-formed laminated sections bent to conform to the tank with the layers thereof offset with respect to each other to form overlapping joints between adjacent sections, and means extending through the layers for connecting the same together and for maintaining the sections in their pre-formed shape.

8. In a tank, means for insulating the same comprising an insulating covering formed of laminated sections, the laminations of the sections being offset with respect to each other said sections being bent to conform to the tank, means extending through the laminations for connecting the same and for maintaining them in tank conforming shape, and binding bands externally girdling the covering formed by the sections to secure the same to the tank.

In witness whereof I have hereunto set my hand.

VICTOR WILLOUGHBY.